(12) United States Patent
Rosenberg

(10) Patent No.: US 11,299,052 B2
(45) Date of Patent: Apr. 12, 2022

(54) INDUSTRIAL TRUCK COMPRISING AN ELECTRICAL PLUG CONNECTOR

(71) Applicant: Jungheinrich Aktiengesellschaft, Hamburg (DE)

(72) Inventor: Tilman Rosenberg, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 600 days.

(21) Appl. No.: 16/251,371

(22) Filed: Jan. 18, 2019

(65) Prior Publication Data
US 2019/0225101 A1 Jul. 25, 2019

(30) Foreign Application Priority Data
Jan. 24, 2018 (DE) .................... 10 2018 101 529.1

(51) Int. Cl.
*B60L 53/16* (2019.01)
*B66F 9/075* (2006.01)
(Continued)

(52) U.S. Cl.
CPC .......... *B60L 53/16* (2019.02); *B66F 9/07504* (2013.01); *B66F 9/07531* (2013.01);
(Continued)

(58) Field of Classification Search
CPC .. B60L 53/16; B60L 2200/44; B66F 9/07531; B66F 9/07504; H01R 13/62;
(Continued)

(56) References Cited

U.S. PATENT DOCUMENTS 3,905,835 A * 9/1975 Kasai .................... H01M 50/116
429/206
5,191,276 A * 3/1993 Zainaleain ............ H02J 7/0042
320/110
(Continued)

FOREIGN PATENT DOCUMENTS

DE 102009021274 A1 11/2010
DE 102014113461 A1 3/2016
(Continued)

OTHER PUBLICATIONS

DE102018101529.1 filed Jan. 24, 2018, German Search Report dated Jan. 4, 2019; 10 pages.
(Continued)

*Primary Examiner* — M Baye Diao
(74) *Attorney, Agent, or Firm* — Barclay Damon LLP

(57) ABSTRACT

An industrial truck comprises a drive part comprising a battery compartment and a battery having a cladded exterior surface and is positioned within a housing. The housing is configured to be positioned within the battery compartment. An electrical plug connector is configured to be electrically connected to the battery such that the electrical plug connector is configured to supply power to the battery during a charging process. The electrical plug connector has a plug-in direction for an external electrical plug connector and the plug-in direction has an angle of 20° to 70° relative to a horizontal axis.

10 Claims, 4 Drawing Sheets

(51) Int. Cl.
 *H01R 13/62* (2006.01)
 *H02J 7/00* (2006.01)
 *H01R 13/516* (2006.01)
(52) U.S. Cl.
 CPC .......... *H01R 13/516* (2013.01); *H01R 13/62* (2013.01); *H02J 7/0045* (2013.01); *B60L 2200/44* (2013.01)
(58) Field of Classification Search
 CPC .... H02J 7/0045; Y02T 10/7072; Y02T 90/14; Y02T 10/70
 USPC ........................................................ 320/104
 See application file for complete search history.

(56) References Cited

U.S. PATENT DOCUMENTS

| | | | | |
|---|---|---|---|---|
| 6,634,896 | B1 * | 10/2003 | Potega | H02J 7/0068 |
| | | | | 439/218 |
| 6,749,387 | B1 * | 6/2004 | Saxer | B65G 61/00 |
| | | | | 414/458 |
| 6,945,803 | B2 * | 9/2005 | Potega | G01R 31/36 |
| | | | | 439/218 |
| 9,481,555 | B2 * | 11/2016 | Rosenberg | B66F 9/07545 |
| 9,586,605 | B2 | 3/2017 | He et al. | |
| 10,183,563 | B2 * | 1/2019 | Rayner | B62K 27/003 |
| 10,483,907 | B2 * | 11/2019 | Vignal | H02S 40/34 |
| 2016/0344070 | A1 * | 11/2016 | Chujo | B60L 50/52 |
| 2019/0225101 | A1 * | 7/2019 | Rosenberg | H01R 13/62 |
| 2021/0214205 | A1 * | 7/2021 | Strong | B66F 9/24 |

FOREIGN PATENT DOCUMENTS

| | | | | |
|---|---|---|---|---|
| EP | 2138444 | B1 * | 9/2011 | ............. H01H 3/022 |
| EP | 2607293 | B1 * | 1/2015 | .......... B66F 9/07531 |
| GB | 2423503 | A * | 8/2006 | ......... H01R 13/6315 |
| JP | 2002316794 | A | 10/2002 | |
| JP | 200373099 | A | 3/2003 | |

OTHER PUBLICATIONS

EP 19151235.9 filed Jan. 10, 2019, European Search Report dated Jul. 3, 2019; 6 pages.

* cited by examiner

INDUSTRIAL TRUCK COMPRISING AN ELECTRICAL PLUG CONNECTOR

CROSS REFERENCE TO RELATED INVENTION

This application is based upon and claims priority to, under relevant sections of 35 U.S.C. § 119, German Patent Application No. 10 2018 101 529.1, filed Jan. 24, 2018, the entire contents of which are hereby incorporated by reference.

BACKGROUND

The present invention relates to an industrial truck comprising a drive part and a load part as well as a battery which is arranged in a battery compartment of the drive part and which is configured to be connected in an electrically conductive manner via cables to an electrical plug connector for supplying power to the battery.

In electrically operated industrial trucks, it is provided that the battery remains on board for charging processes and is charged externally via a power supply unit. In principle, it is also possible to discharge the battery in this manner. The supply of power to the battery is either power provided from an external charging device, or a power supply unit by which an on-board charging device is supplied with power in order to charge the on-board battery with the charging current. During a charging process, the supply of power and the current transfer to the battery are carried out via electrical plug connectors. An electrical plug connector in this case is provided fixed to the vehicle in order to be connected in an electrically conductive manner to an external electrical plug connector. The electrical plug connectors in the vehicle and the external plug connector are adapted to one another and produce an electrically conductive connection when plugged together.

Industrial trucks are used in a challenging working environment for people and machines. Thus the production of an electrically conductive connection between the plug connectors should not be associated with physical exertion which is too great or with unusual movements. For ergonomic reasons, therefore, it is also particularly important to provide an electrical plug connector on the industrial truck which may be easily handled for connecting to an external plug connector.

In industrial trucks it is known to position a plug connector, which is arranged fixedly on the vehicle, on an upper face of the battery box. The plug-in direction of the plug connector thus arranged is generally horizontal so that the external electrical plug connector is pushed horizontally to produce the electrically conductive connection. Specifically with a relatively large plug-in force for the electrical plug connectors, as is required in a design using larger currents, this arrangement may be ergonomically disadvantageous, in particular the arrangement below shoulder height makes the process significantly dependent on the body size of the operator.

BRIEF SUMMARY OF THE INVENTION

The object of the invention is to provide an industrial truck which provides in a particularly ergonomic manner an electrical plug connector on the vehicle.

In an embodiment, an industrial truck comprises a battery compartment or a battery space which is preferably arranged adjacent to a driver's position of the vehicle. The battery may be connected via an electrical conductor, preferably one or more cables, to an electrical plug connector for supplying the battery by means of a power supply unit. The battery and electrical plug connector are preferably connected together in an electrically conductive manner. In an embodiment, the electrical plug connector has a plug-in direction for an external plug connector which encloses an angle of 20° to 70° relative to the horizontal. The angle relative to the horizontal makes it possible to plug in the external plug connector easily from above, in a direction facing downwardly toward the ground. The angular range of 20° to 70° of the movement guided obliquely from top to bottom has proved to be particularly advantageous ergonomically since a movement guided in this direction permits a plug-in force predetermined by the plug connectors to be overcome without significant physical exertion. In contrast to a purely horizontal or vertical movement, an operator may apply the required movement force ergonomically by a natural arm movement. This is based partially on the recognition that operators of different body size intuitively maintain a distance from the plug connector which permits simple plug-in/removal.

In an embodiment, the obliquely inclined plug-in direction is combined with the height for attaching the electrical plug connector. According to the invention, the electrical plug connector is attached to the drive part at a height of 600 mm to 900 mm, preferably at a height of 650 mm to 810 mm. In conventional industrial trucks the electrical plug connector is frequently attached to the vehicle at a height of more than 1000 mm. In the embodiment where the electrical plug connector is at a height of 600 mm to 900 mm, the operator is preferably standing outside the vehicle on the ground and pushes the external plug connector from top to bottom into the electrical plug connector provided on the vehicle side.

With regard to the orientation of the plug-in direction, it is possible to differentiate between a situation in which the plug-in direction extends substantially in the X-Z plane parallel to the vehicle longitudinal direction and the situation in which the plug-in direction extends substantially in the Y-Z plane transversely to the vehicle longitudinal direction. In many situations it is advantageous if the plug-in direction substantially extends in the X-Z plane parallel to the vehicle longitudinal direction since the industrial truck may then be parked closer to the side of a boundary wall, without making the connection of the external plug connector more difficult. By means of the plug-in direction substantially in the X-Z plane parallel to the vehicle longitudinal direction, it is thus still possible to connect this vehicle to the power supply unit without relocating the vehicle. In an embodiment, the electrical plug connector is accessible from the side of the load part, wherein this side is also expediently arranged so as to be clearly visible with a free view of the connections.

In an development, one or more lateral insertion aids are provided for the electrical plug connector, said lateral insertion aids are configured to guide the external electrical plug connector in the desired direction. The insertion aid in this case is configured in the manner of a guide plate or a funnel and guides the external plug connector into a position which permits a coupling of the two plug connectors.

In an embodiment, the industrial truck is provided with a mast or a lifting mast and the electrical plug connector is attached to the drive part on the side adjacent to the mast. The external plug connector is introduced past the mast in the electrical plug connector provided on the vehicle.

In an embodiment, the electrical plug connector is mounted on a side surface of the battery and in this case is accessible through a through-passage in the exterior cladding or through a gap between the cladding and battery. The electrical plug connector in this case may protrude outwardly through the gap or the cladding in the region of the battery compartment or terminate flush therewith. It is also possible to fasten the electrical plug connector to the cladding of the drive part. A protective housing for the electrical plug connector which provides additional protection for the contacts may also be provided.

In an embodiment, the electrical plug connector is pivotably arranged about a horizontal axis in order to adapt the angle of the plug connector to the horizontal axis depending on the direction of movement of the arm of the operator. The pivotability about the horizontal axis may, in particular, be in the aforementioned angular range of 20° to 70°. The electrical plug connector may be freely pivotable so that when inserting the external plug connector it is automatically oriented in the plug-in direction. Alternatively, a fixing option may be provided so that the plug connector may be fixed in the desired angular position.

In an embodiment, the electrical plug connector is arranged such that the external plug connector may be inserted by a standing operator in a continuous movement such as a continuous ergonomic natural arm movement. It may also be provided that the plug connectors, for example, are coupled together by a snap connection or the like and the connection is secured.

BRIEF DESCRIPTION OF THE DRAWINGS

An embodiment of the industrial truck according to the invention is described in more detail hereinafter by an example. In the drawings.

DETAILED DESCRIPTION OF THE INVENTION

Figure 1:
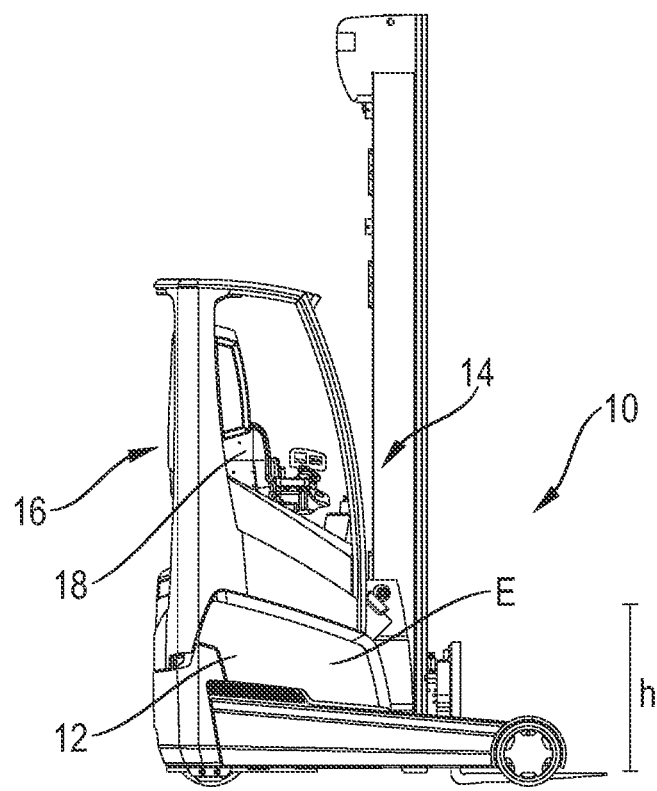
FIG. 1 illustrates a side view of an embodiment of a reach truck.

FIG. 1 shows an industrial truck 10 which has a drive part 12 and a lifting mast 14. The drive part 12 has a driver's position 16 with a seat 18 covered by a roof. Integrated in the drive part 12 is a drive battery (not visible) which provides power to the electrical consumers.

Figure 2:
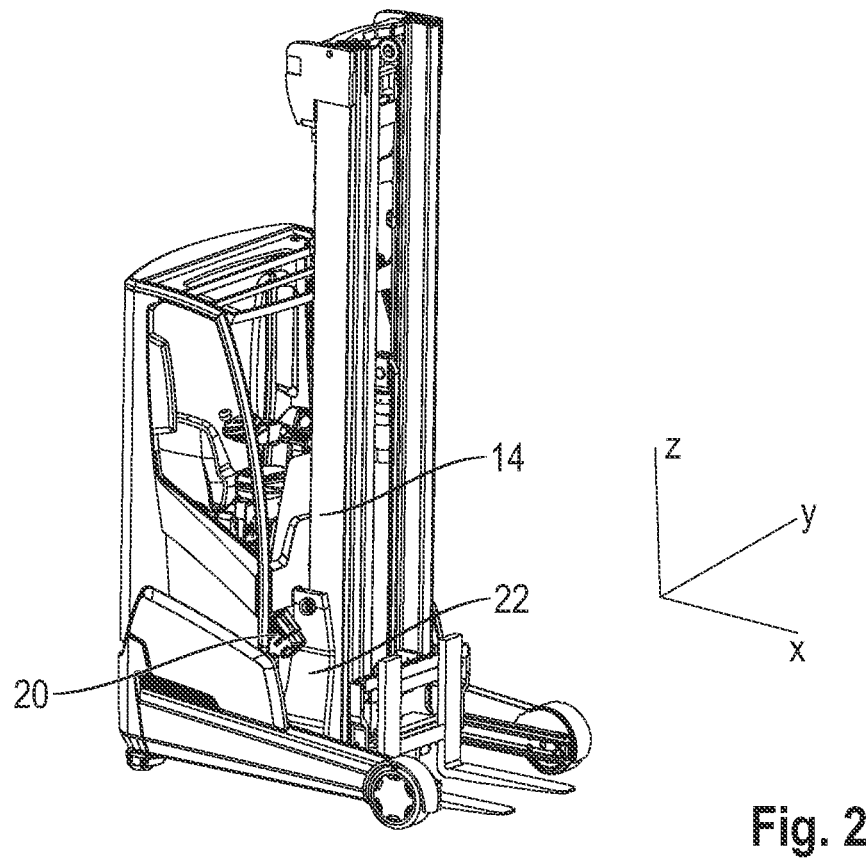
FIG. 2 illustrates a front perspective view of an embodiment of the reach truck with an embodiment of an electrical plug connector.

FIG. 2 shows in a view obliquely from the rear an electrical plug connector 20 which is visible in the drive part 12. The electrical plug connector 20 is located at the side adjacent to a mast holder 22 which holds the lifting mast 14. The electrical plug connector 20 is attached to the battery (not shown).

Figure 5:
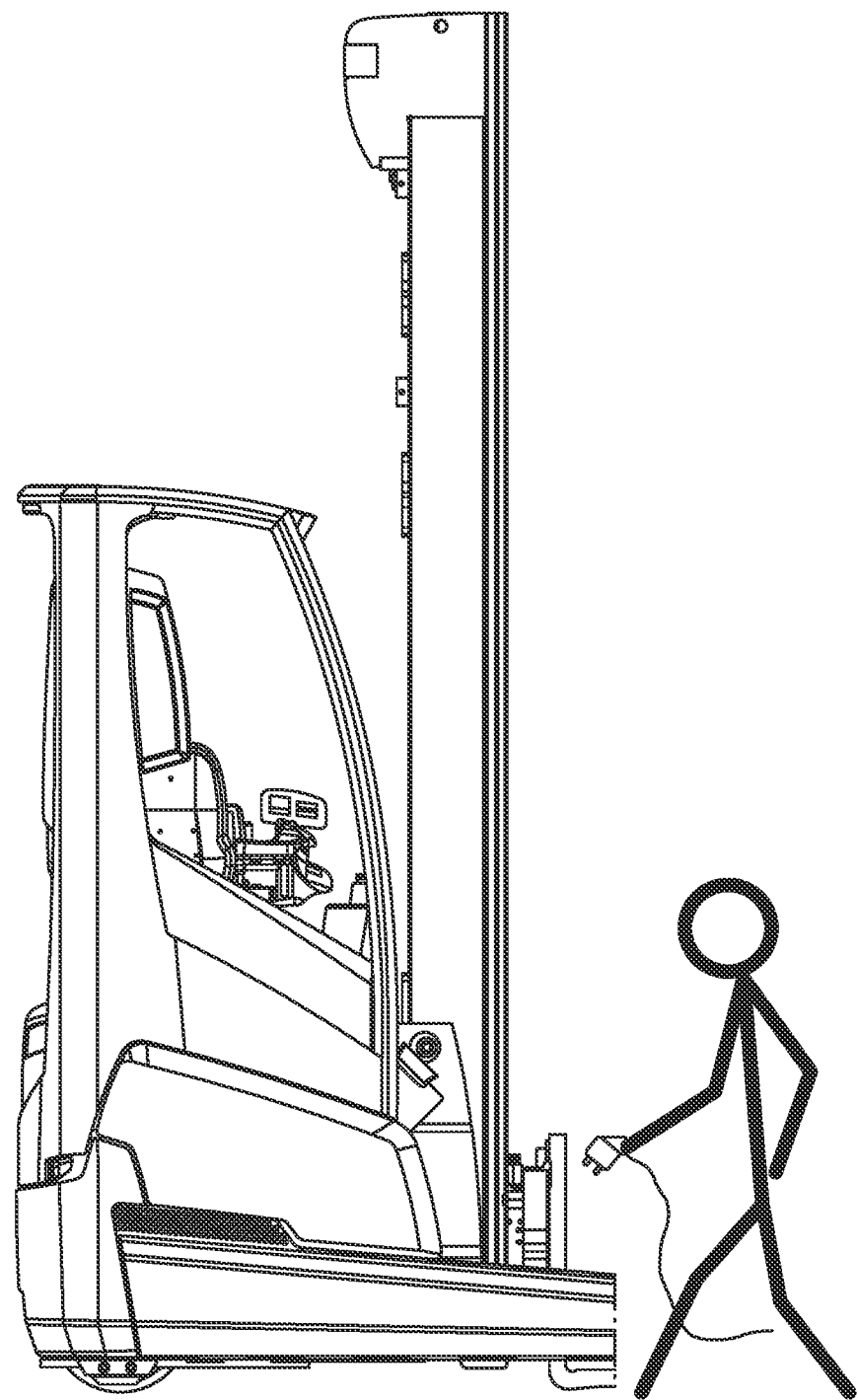
FIG. 5 illustrates a schematic view of an operator with an embodiment of an external plug connection.

The electrical plug connector 20 is arranged in the drive part 12 such that an operator standing adjacent to the industrial truck, whose face faces the vehicle, is able to insert an external plug connector with the right hand. This situation is additionally illustrated in FIG. 5. The insertion direction of the electrical plug connector is shown in FIG. 1 as the line E. The line E in this case has an inclination of 45° relative to the horizontal and naturally also relative to the vertical. The horizontal or horizontal axis is an axis that extends along or parallel to the X-axis that is shown in FIG. 2. The height h (FIG. 1) of the electrical plug connector above the ground is 730 mm. The height and insertion direction have proved particularly ergonomic for operators having a body size of 1.75 m to 2.00 m.

Also illustrated in FIG. 2 is the coordinate system used in this application, the X-axis thereof being oriented in the vehicle longitudinal direction, the Y-axis thereof being oriented in the vehicle transverse direction and the Z-axis thereof being oriented vertically.

Figure 3:
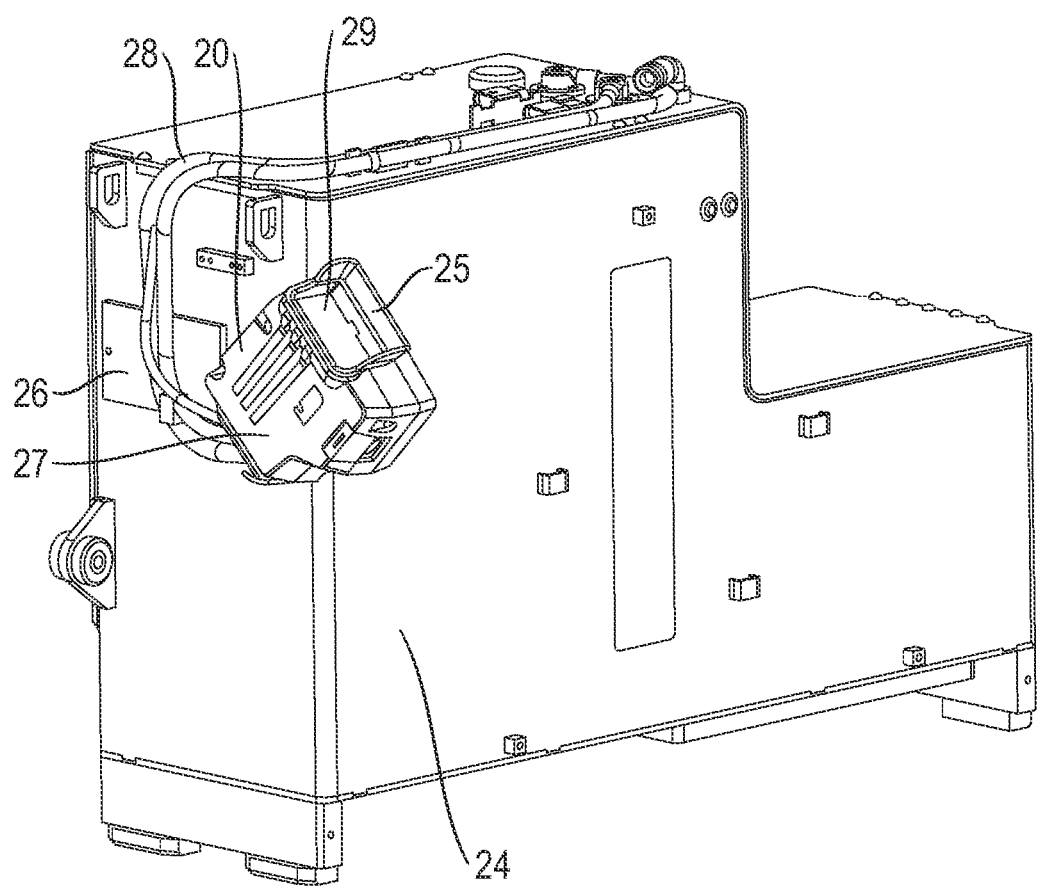
FIG. 3 illustrates a close-up view of an embodiment of a battery for the reach truck with an embodiment of the electrical plug connector.

FIG. 3 shows the attachment of the electrical plug connector 20 to a battery body 24. A holding plate 26 is mounted on the battery body 24. The electrical plug connector has an orientation which is inclined by 45° relative to the horizontal. The electrical plug connector 20 may be connected in an electrically conductive manner via the cables 28 to the battery 24. The electrical plug connector 20 has an insertion aid 25. The insertion aid 25 defines the lateral insertion of an external electrical plug connector. The battery provided with the insertion aid 25 is arranged in a battery compartment (not shown) of the drive part 12 and is accessible from outside through a through-passage in the cladding or, respectively, through a gap between the cladding and battery. The electrical plug connector is held in a protected manner in a housing 27. The housing 27 has a cover 29 which blocks access to the electrical plug connector and is pushed to the side by inserting the external plug.

Figure 4:
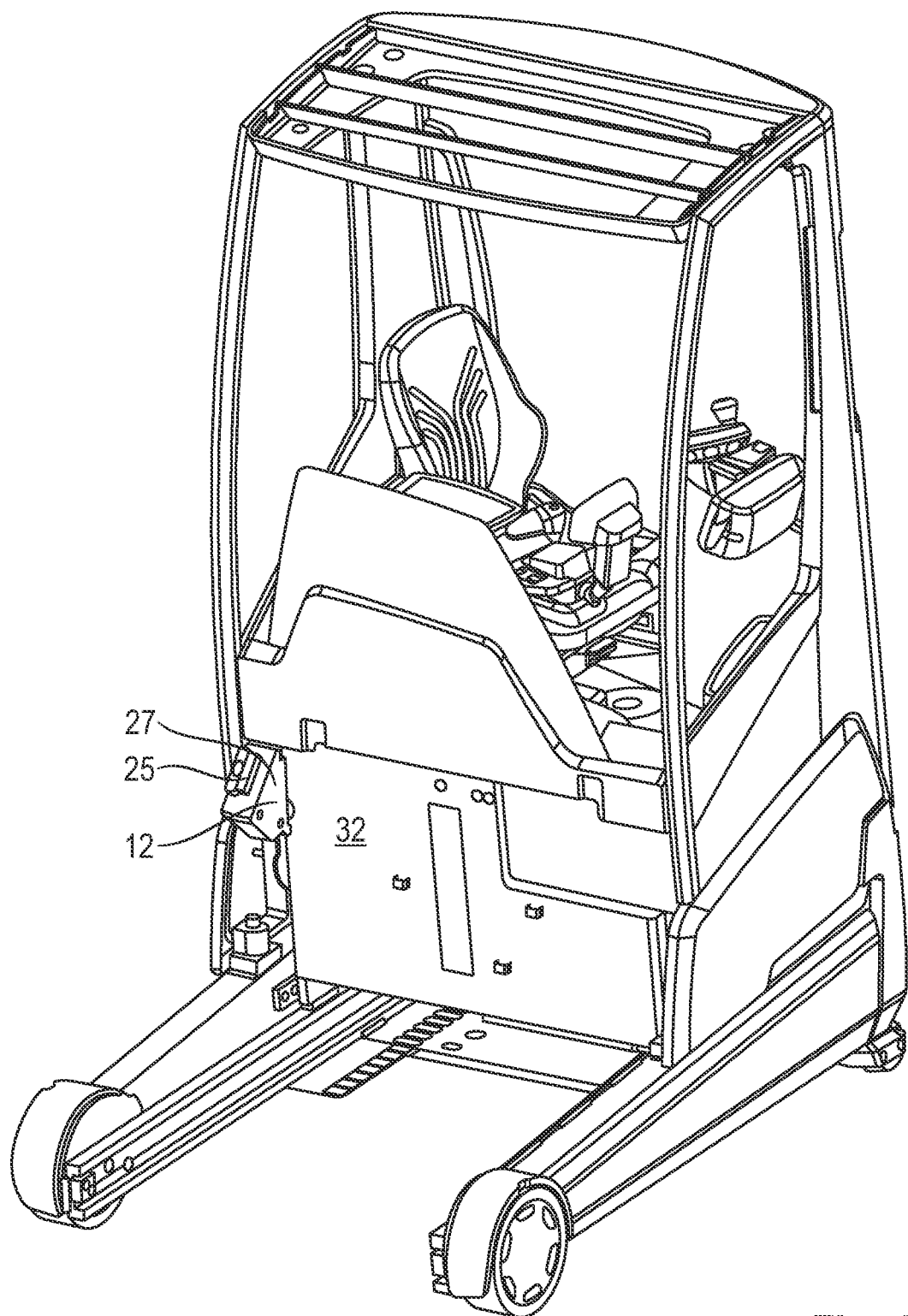
FIG. 4 illustrates a rear perspective view of an embodiment of a drive part of the reach truck without the load part.

FIG. 4 shows the drive part 12 of a reach truck with an electrical plug connector 20 arranged to the side, the insertion direction thereof extending in the vehicle longitudinal direction. It is possible to identify clearly the housing 27 with its insertion aid 25, which both protrude over a rear wall 32 of the drive part. The electrical plug connector 20 in turn is covered in its inclined position by the cover 29. The housing 27 protects the electrical plug connector 20 and its contacts from environmental influences.

LIST OF REFERENCE NUMERALS

10 Industrial truck
12 Drive part
14 Load part
14' Mast or lifting mast
16 Driver's stand
18 Seat
20 Electrical plug connector
22 Mast holder
24 Battery body
25 Insertion aid
26 Holding plate
27 Housing
28 Electrical conductor
29 Cover
32 Rear wall
E Plug-in direction

The invention claimed is:

1. An industrial truck comprising:
a drive part comprising a battery compartment;
a battery having a cladded exterior surface defining a passage and positioned within a housing, wherein the housing is configured to be positioned within the battery compartment; and
an electrical plug connector mounted on a side surface of the battery and accessible through the passage in the cladded exterior, the electrical plug connector configured to be electrically connected to the battery, wherein the electrical plug connector is configured to supply power to the battery during a charging process, wherein the electrical plug connector has a plug-in direction for an external electrical plug connector, and wherein the plug-in direction has an angle of 20° to 70° relative to a horizontal X axis and extends along a plane that is parallel to a vehicle longitudinal direction.

2. The industrial truck according to claim 1, wherein the electrical plug connector is attached at a height of 600 mm to 900 mm to one of the drive part and the housing.

3. The industrial truck according to claim 2, wherein the electrical plug connector is configured to be pivoted relative to the horizontal X axis.

4. The industrial truck according to claim 3, wherein the external electrical plug connector may be inserted into the electrical plug connector by a standing operator in a continuous ergonomic natural arm movement.

5. The industrial truck according to claim 3, wherein the electrical plug connector further comprises a cover configured to block access to the electrical plug connector.

6. The industrial truck according to claim 5, wherein the cover is configured to be pushed to a side by inserting an external plug.

7. The industrial truck according to claim 1, wherein the plug-in direction of the electrical plug connector extends in a plane that is transverse to a vehicle longitudinal direction.

8. The industrial truck according to claim 1, further comprising at least one lateral insertion aid configured to guide insertion of the external electrical plug connector into the electrical plug connector.

9. The industrial truck according to claim 8, further comprising a mast, wherein the electrical plug connector is attached to the drive part on a side adjacent to the mast.

10. The industrial truck according to claim 1, wherein the plug connector is freely pivotable about a pivot axis.

* * * * *